Patented Aug. 18, 1925.

1,549,833

UNITED STATES PATENT OFFICE.

CLARENCE J. HERRLY, OF PITTSBURGH, PENNSYLVANIA, ASSIGNOR TO CARBIDE AND CARBON CHEMICALS CORPORATION, A CORPORATION OF NEW YORK.

HIGHER CONDENSATION PRODUCTS OF ACETALDEHYDE AND PROCESS FOR MAKING THE SAME.

No Drawing.    Application filed February 5, 1921. Serial No. 442,819.

*To all whom it may concern:*

Be it known that I, CLARENCE J. HERRLY, a citizen of the United States, residing at Pittsburgh, in the county of Allegheny and State of Pennsylvania, have invented certain new and useful Improvements in Higher Condensation Products of Acetaldehyde and Processes for Making the Same, of which the following is a specification.

My invention relates to products formed by advancing condensation of acetaldehyde and to methods for obtaining such products. The products of my invention have a remarkable power of producing a frothing liquid when added in very small proportions to water, and are useful as frothing agents in certain ore concentrating processes and for other purposes.

As is well known, aldol may be prepared from acetaldehyde by subjecting the latter, for a time, to the action of an alkali, sufficient alkali being added to neutralize the acetic acid usually contained in acetaldehyde as an impurity, and to provide a quantity of free alkali sufficient to effect the polymerization or condensation to aldol. The reaction may be represented by the following equation:

(1) $2CH_3CHO \rightarrow C_4H_8O_2$

To purify the aldol so formed, the added alkali may be neutralized with an acid or acid salt, and the reaction mixture distilled to remove any unconverted acetaldehyde, any salts which crystallize out being filtered off if desired. The residue after distillation contains the aldol.

It is also known that a further polymerization of aldol to paraldol is quite easily brought about in accordance with the equation:

(2) $2C_4H_8O_2 \rightarrow C_8H_{16}O_4$
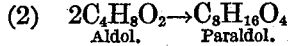

Processes for the preparation of aldol and paradol are well known in the prior art and form no part of the present invention. For this reason they need not be further described.

I have discovered that valuable products of a still further condensation or polymerization may be formed in accordance with the process hereinafter described, such further condensation or polymerization being represented, for example, by the following equations:

(3) $C_8H_{16}O_4 \rightarrow C_8H_{14}O_3 + H_2O$
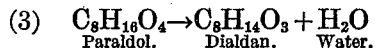

(4) $2C_8H_{14}O_3 \rightarrow C_{16}H_{28}O_6$
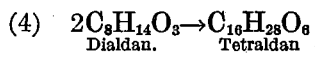

The formation of the higher condensation products begins immediately upon the addition of a suitable condensing agent, and if so desired, the condensation may be caused to proceed quite rapidly. Substances suitable for condensing agents may be either acid or alkaline in reaction, as will appear from the examples given below. The rate of condensation may be controlled by the nature and amount of the condensing agent used, and the action may be brought to an end by removing or destroying the condensing agent, for example by neutralization with a suitable reagent. Among the condensing agents which I have found to give good results are the mineral acids (e. g. sulfuric, phosphoric and hydrochloric), the strong organic acids (such as oxalic), the acid salts (such as sodium acid sulfate), and such alkalies as can be used in a way to produce condensation without the separation of resinous substances. When organic acids or acid salts are used, larger amounts must be employed than in the case of mineral acids, if the same rate of condensation is desired. Condensation at desirable rates has been obtained by the use of 0.001% to 2% or more of condensing agent.

An intensive condensing action may result in the formation of more condensation product than can dissolve in the unchanged aldol. Under these circumstances, the condensation product may separate in solid form. Products have been isolated in this way which are rather insoluble in water but soluble in such organic solvents as alcohol, ether, acetone and aldol. Such solutions are highly effective as frothing agents. In many cases, however, it is preferable to limit the condensation product formed to an amount which can remain in permanent solution in the uncondensed aldol and preferably to an amount less than is required to saturate the aldol, since the solid products referred to above are practically insoluble in water and are therefore useless as frothing agents unless separated and dissolved in a suitable solvent. The additional operations thus required are undesirable in many instances.

In practicing the processes of my invention, I may use as starting material aldol prepared by any method, either containing acetaldehyde or free from this impurity. If acetaldehyde is present, paraldehyde and metaldehyde may be formed in small amounts during the condensation, but this does not interfere with the main condensation. When using some condensing agents, there is a tendency to form crotonaldehyde as a by-product. The presence of acetaldehyde tends to prevent this side reaction and is to that extent advantageous. Paraldol and solutions thereof may also be used as starting material.

The following specific examples will further elucidate my invention:

I. Three hundred pounds of aldol containing a little acetaldehyde are thoroughly mixed with 1% of 50% sulfuric acid (all parts by weight). In about 48 hours, a layer containing water settles out. When the aldol is chilled, crystals of dialdan and tetraldan will soon deposit and are filtered off, washed and dried. These crystals, either with or without washing and drying, may be dissolved in any suitable solvent and the solution so produced forms an excellent frothing agent. The residual liquor out of which the crystals separated may also be employed as a frothing agent.

II. Aldol of the kind and quantity mentioned in Example I is thoroughly mixed with 10% of 10% sulfuric acid (i. e. 1% $H_2SO_4$) and allowed to stand for 24 hours at room temperature. The acidity is then neutralized with sodium carbonate and the sodium sulfate thus formed separated by settling or filtration. The resulting product is soluble in water and contains a considerable amount of higher condensation products. It is much superior to the original aldol in frothing power. Phosphoric acid may be substituted for sulfuric acid in the above example with good results.

III. Aldol, as above, is thoroughly mixed with 1% of oxalic acid, contained in a concentrated aqueous solution. Within 12 hours, the frothing power is largely increased. Higher condensation products will crystallize out after long standing.

IV. Sodium acid sulfate is substituted in equal quantity for the oxalic acid of Example III, with like results.

V. Aldol, as before, is mixed with 1% of quicklime. The color gradually darkens with an increase in frothing power.

As little as 0.001% of concentrated hydrochloric acid will gradually condense aldol, and in time give a product of high froth-producing power. When condensation is effected by the use of alkaline agents, as in Example V above, there is a tendency for resinous products to separate from the liquid, these products being without frothing properties in their insoluble condition. The strength and quantity of the alkali used should accordingly be limited so as to avoid the formation of such products.

When employed as frothing agents in the ore concentrating processes referred to above, the novel products described herein are preferably used in conjunction with a collecting agent such as thiocarbanalid. Such ore concentration processes form no part of my invention, the novel features of which I claim without reference to any particular use to which the products may be applied. The scope of my invention is limited only by the appended claims. The terms "mineral acid" and "acid condensing agent" as used in the claims include such acids as fall within the scope of the quoted expressions, whether or not a part of the replaceable hydrogen has been substituted by a metal to form an acid salt.

I claim:

1. As a new composition of matter, a substantially water-insoluble froth-producing condensation product of acetaldehyde and a solvent therefor.

2. As a new composition of matter, a solution comprising aldol and a substantially water-insoluble froth-producing condensation product of acetaldehyde.

3. A new composition of matter comprising a condensation product of acetaldehyde higher than paraldol, and a solvent therefor.

4. A new composition of matter comprising a condensation product of acetaldehyde higher than paraldol, and a solvent therefor comprising aldol.

5. Process of preparing from aldol water-insoluble froth-producing condensation products which comprises subjecting the aldol to the action of a condensing agent comprising a strong acid.

6. Process of preparing from aldol higher condensation products than paradol which comprises subjecting the aldol to the action of a mineral acid condensing agent.

7. A solution containing froth-producing condensation products of acetaldehyde higher than paradol, said solution being substantially identical with a solution produced by the herein described process of treating aldol with a mineral acid.

8. Process which comprises treating aldol with a condensing agent adapted to form a substantially water-insoluble froth-producing product of limited solubility in aldol, and limiting the quantity of such product formed to that which will dissolve in the aldol present.

9. Process which comprises treating aldol with a condensing agent adapted to form a substantially water-insoluble froth-producing product of limited solubility in aldol, and stopping the formation of such product before it is present in sufficient quantity to separate out in solid form.

10. Process which comprises treating aldol with a condensing agent adapted to form a substantially water-insoluble froth-producing product soluble in aldol, and stopping the condensation before the equilibrium of the condensed and uncondensed aldol is established.

11. Process of preparing from aldol higher condensation products than paraldol which comprises subjecting the aldol to the action of an acid condensing agent for sufficient time to produce a partial condensation, and then neutralizing the condensing agent.

In testimony whereof, I affix my signature.

CLARENCE J. HERRLY.